3,191,047
OPTICAL MASER HETERODYNING USING
PHOTORESPONSIVE DETECTORS
Bernard M. Oliver, Los Altos Hills, Calif., assignor to
Hewlett-Packard Company, Palo Alto, Calif., a corporation of California
Filed Sept. 28, 1961, Ser. No. 141,522
6 Claims. (Cl. 250—220)

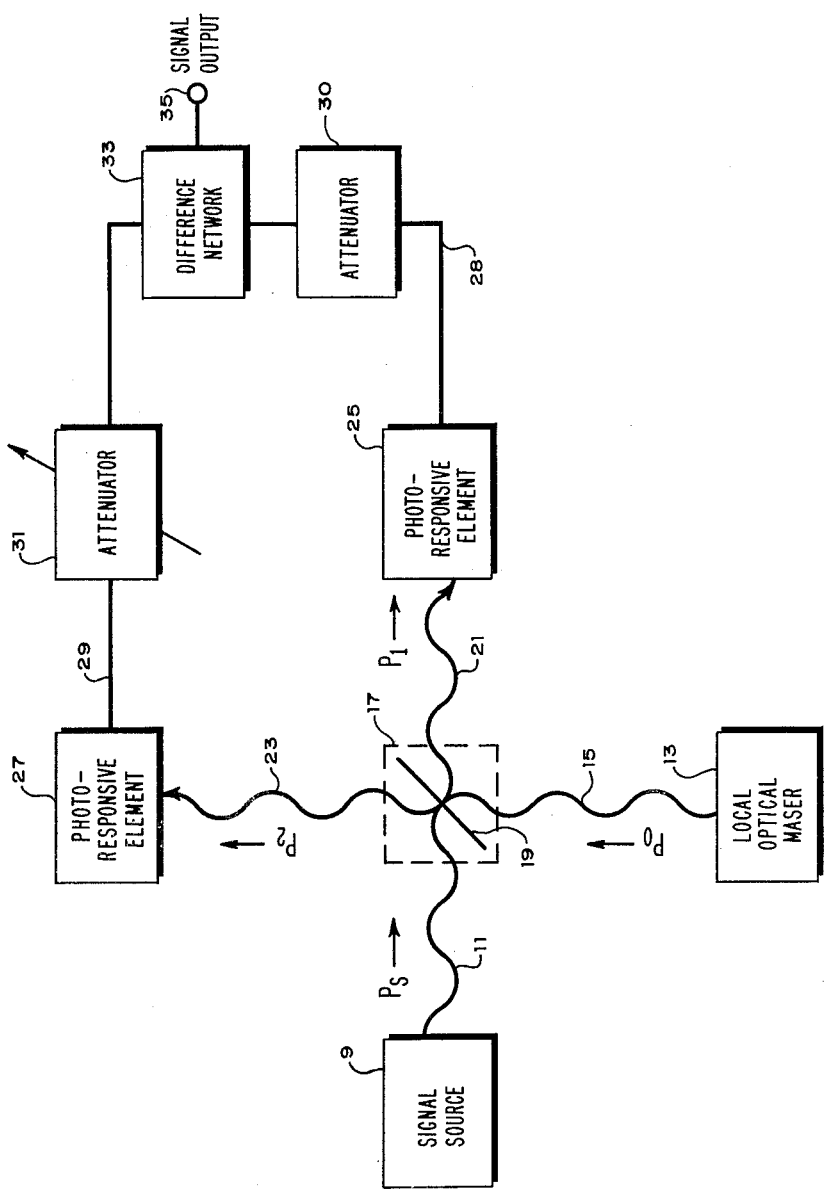

This invention relates to apparatus for detecting signals produced by a source of coherent light waves.

Optical masers produce coherent light waves at substantially constant frequencies which may be used as carriers for transmitting large quantities of information. These waves are said to be spatially coherent because the wavefronts are planes perpendicular to the direction of propagation. These waves are also said to be time coherent for the interval between wave crests is substantially fixed. Waves of this type when used to transmit information must be detected to recover the information substantially as transmitted. One known signal detection scheme uses a local optical maser which produces a wave of slightly different frequency than the received wave. The locally produced wave is added to the received wave. A photoresponsive device is adapted to receive the resultant waves and to provide an electrical signal that varies at the difference frequency. One disadvantage of this signal detecting scheme is that the electrical signal also varies with changes in the output power of the local optical maser.

It is an object of the present invention to provide a signal detector for coherent light waves.

It is another object of the present invention to provide a photoelectric mixer for amplifying and converting the frequency of the signals produced by a coherent optical source.

It is still another object of the present invention to provide a photoelectric mixer which responds to applied coherent light waves to produce an electrical signal which is independent of small variations in the output power of the local coherent optical source.

It is a further object of this invention to provide an optical mixer or heterodying means having power amplification and a signal to noise capability substantially equal to that of an ideal amplifier.

In accordance with the illustrated embodiment of the present invention the output wave of the local optical maser is mixed with the incoming light wave at a partially-reflecting, partially-transmitting surface. A photoresponsive element is disposed to receive light waves composed of the reflected local wave and transmitted signal wave. Another similar photoresponsive element is disposed to receive light waves composed of the transmitted local wave and reflected signal wave. Each of the photoresponsive elements provides an electrical signal that varies in response to changes in the power of the light waves incident upon the element. The desired electrical signal is obtained as the difference between the electrical signals provided by each of the photoresponsive elements. Thus the power of the desired electrical signal remains substantially unaffected by changes in the output power of the local optical maser.

Other and incidental objects of the present invention will be apparent from a reading of this specification and an inspection of the accompanying drawing which shows a photoelectric mixing device in accordance with the present invention.

Referring now to the drawing, coherent light wave signals 11 are produced by the signal source 9. The light waves 11 are received at a power level $P_s$. A local optical maser 13 produces light waves having a predetermined wavelength and having a power $P_0$. A mixer 17 which includes a partially-reflecting, partially-transmitting surface 19 is provided to mix the incident light waves 11 and 15. The surface 19, which is disposed along the bisector of the intersection angle of waves 11 and 15, may be a mirror surface having a reflection coefficient K for the light waves produced by the signal and local optical masers. By reflection coefficient is meant the ratio of the reflected electromagnetic radiation power to the incident electromagnetic radiation power. Thus, each of the incident waves 11 and 15 is partially reflected and partially transmitted by the mirror surface 19 of mixer 17. The resultant wave 21 has a power $P_1$ that is substantially equal to the sum of the reflected power of wave 15 and the transmitted power of wave 11. The resultant wave 23 has a power $P_2$ that is substantially equal to the sum of the transmitted power of wave 15 and the reflected power of wave 11. Thus, by selecting a surface 19 having reflection coefficient K of approximately one-half, the average power of resultant wave 21 is made substantially equal to the average power of resultant wave 23. A photoresponsive element 25 having high quantum efficiency is disposed to receive the resultant wave 21. By quantum efficiency is meant the average number of electrons produced per photon absorbed. Thus, a photo-diode which is known to have high quantum efficiency may be used as the photoresponsive element 25. A similar photoresponsive element 27 is disposed to receive the resultant wave 23. Each of the photoresponsive elements 25 and 27 thus produces an electrical signal that varies with changes in the power of waves 21 and 23, respectively. The electrical signals produced by photoresponsive elements 25 and 27 are applied through lines 28 and 29 to attenuators 30 and 31. Difference network 33 is connected to receive the signals from each of the attenuators and is adapted to produce a signal at the output terminal 35 which varies as the difference between the signals appearing at the outputs of attenuators 30 and 31. Attenuator 31 may be adjusted to balance the signals produced by each of the photoresponsive elements 25 and 27. Unbalance in these signals may arise from such factors as a difference in the quantum efficiency of the photoresponsive elements, from a value other than one-half in the reflection coefficient K of the mixer and from a combination of these unbalancing factors.

The present apparatus provides nearly ideal signal-to-noise performance when operated as a heterodyne mixer. Heterodyne mixing is achieved by operating the local optical maser 13 at a different frequency than the frequency of the received waves 11. However, quantum mechanical analysis of the present apparatus indicates that improved signal-to-noise performance is attainable when the local optical maser 13 is operated at the same frequency and phase as the signal optical maser 9. This improvement over heterodyne mixing is due to the increase in signal gain resulting from the mixing process while the noise, which arises after the mixing process, remains unaffected. The best signal-to-noise performance is obtained when the local optical maser power is made much greater than the signal power, in which case the mixer provides a power amplification as well.

The signal detector of the present invention thus provides distinct operating advantages not attainable in other known detectors of coherent optical signals. The signal detector of the present invention uses all of the received optical signal energy to produce an electrical signal. In addition, since both the reflected and transmitted portions of the waves from both the local and signal optical masers are used in a balanced mixer, the electrical signal thus produced is unaffected by incremental changes in the output power of the local optical maser. Also, improved signal-to-noise performance of the apparatus of the present invention over usual heterodyne mixers may be achieved when the light waves produced by the local optical maser have the same frequency and phase as the received light waves.

I claim:

1. Apparatus for detecting signal from a source of coherent light, the apparatus comprising a local source of coherent light, the wavelength of the light from the local source being a predetermined relationship to the wavelength of the light from the signal source, a surface exhibiting partial reflection and partial transmission of said light, the surface being disposed to receive on the opposite sides thereof the light from said local source and from the signal source and being adapted to produce first and second waves from said received light, the first wave having a frequency equal to the difference between the frequency of light from said local and signal sources, the second wave having the frequency of the first wave, a first photoresponsive element disposed to receive the first wave and produce a first signal therefrom, a second photoresponsive element disposed to receive the second wave and produce a second signal therefrom and means connected to receive said first and second signals for producing an output signal as the combination of the first and second signals.

2. Apparatus for detecting signal from a source of coherent light, the apparatus comprising the combination of a local source of coherent light, the wavelength of the light from the local source bearing a predetermined relationship to the wavelength of the light from the signal source, a surface exhibiting partial reflection and partial transmission of said light, the surface being disposed to receive on the opposite sides thereof the light from said local source and from the signal source and being adapted to produce first and second waves from said received light, the first wave having a frequency related to the difference in the frequencies of light from the signal and local sources and having power that is related to the sum of the reflected power from said local source and the transmitted power from the signal source, the second wave having a frequency equal to the frequency of the first wave and having power that is related to the sum of the transmitted power from said local source and the reflected power from the signal source, a first photoresponsive element disposed to receive the first wave and produce a first signal therefrom, a second photoresponsive element disposed to receive the second wave and produce a second signal therefrom, and means producing an output signal related to the difference between the first and second signals.

3. Apparatus for detecting signal from a source of coherent light operating within the region of the electromagnetic spectrum between infrared and ultraviolet, the apparatus comprising the combination of a local source of coherent light, the wavelength of the light from the local source bearing a predetermined relationship to the wavelength of the light from the signal source, a partially transparent surface exhibiting partial reflection and partial transmission of light within said region of the spectrum, the surface being disposed to receive on the opposite sides thereof the light from said local source and from the signal source and being adapted to produce first and second waves from said received light, the first wave having a frequency related to the difference in the frequencies of light from the signal and local sources and having power that is related to the sum of the reflected power from said local source and the transmitted power from the signal source, the second wave having a frequency equal to the frequency of the first wave and having power that is related to the sum of the transmitted power from said local source and the reflected power from the signal source, a first photo-diode disposed to receive the first wave and produce a first signal related to the power absorbed thereby, a second photo-diode disposed to receive the second wave and produce a second signal related to the power absorbed thereby, and means producing an output signal related to the difference between the first and second signals.

4. Apparatus for detecting signal from a source of coherent light operating within the region of the electromagnetic spectrum between infrared and ultraviolet, the apparatus comprising the combination of a local optical maser producing light waves having a wavelength that bears a predetermined relationship to the wavelength of the light waves from the signal source, a semi-transparent surface exhibiting partial reflection and partial transmission of light within said region of the spectrum, the surface being disposed to receive on the opposite sides thereof the light from said local optical maser and from the signal source and being adapted to produce first and second waves from said received light, the first wave having a frequency related to the difference in the frequencies of light from the signal and local sources and having power that is related to the sum of the reflected power from said local optical maser and the transmitted power from the signal source, the second wave having a frequency equal to the frequency of the first wave and having power that is related to the sum of the transmitted power from said local optical maser and the reflected power from the signal source, a first photoresponsive element disposed to receive the first wave and produce a first signal related to the power absorbed thereby, a second photoresponsive element disposed to receive the second wave and produce a second signal related to the power absorbed thereby, and a difference network connected to receive the first and second signal and produce an output signal related to the difference between the first and second signals.

5. A photoelectric mixer for detecting signals produced by an optical maser operating within the region of the spectrum between infrared and ultraviolet, the apparatus comprising the combination of a local optical maser producing light waves having substantially the same wavelength as the light waves from the signal optical maser, a semi-transparent surface exhibiting partial reflection and partial transmission of light within said region of the spectrum, the light waves from the local and signal optical masers being adapted to impinge upon the opposite sides of said surface to intersect at a point within the plane of said surface, the surface being so disposed along the bisector of the angle of intersection of said waves that first and second waves are produced from the reflected and transmitted light waves from said optical masers, the first wave having a frequency equal to the beat frequency of the waves from said optical masers and having power that is equal to the sum of the reflected power from said local optical maser and the transmitted power from the signal optical maser, the second wave having a frequency equal to said beat frequency and having power that is equal to the sum of the transmitted power from said local optical maser and the reflected power from the signal optical maser, a first photo-diode disposed to receive the first wave and produce a first signal related to the power absorbed thereby, a second photo-diode disposed to receive the second wave and produce a second signal related to the power absorbed thereby, and a difference network connected to receive the first and second signals and produce an output signal having said beat frequency and being related to the difference between the first and second signals.

6. A photoelectric mixer for detecting signals produced by an optical maser producing coherent light waves, the apparatus comprising the combination of a local optical maser producing light waves having a shorter wavelength than the light waves from the signal optical maser, a semi-transparent surface exhibiting partial reflection and partial transmission of light waves, the light waves from the local and signal optical masers being adapted to impinge upon the opposite sides of said surface to intersect at a point within the plane of said surface, the surface being so disposed along the bisector of the angle of intersection of said waves that first and second waves are produced from the reflected and transmitted light waves from said optical masers, the first wave having a frequency related to the difference in the frequencies of light from the signal and local sources and having power that is equal to the sum of the reflected power from said local optical maser and the transmitted power from the signal optical maser, the second wave having a frequency equal to the frequency of said first wave and having power that is equal to the sum of the transmitted power from said local optical maser and the reflected power from the signal optical maser, a first photo-diode disposed to receive the first wave and produce a first signal having the frequency of said first wave and an amplitude related to the power absorbed by said first photo-diode, a second photo-diode disposed to receive the second wave and produce a second signal having the frequency of said first wave and an amplitude related to the power absorbed by said second photo-diode, and a difference network connected to receive the first and second signals and produce an output signal having said frequency of the first wave and having an amplitude related to the difference between the amplitudes of the first and second signals.

References Cited by the Examiner
UNITED STATES PATENTS

| | | | |
|---|---|---|---|
| 2,960,002 | 11/60 | Auble et al. | 88—22.5 |
| 3,004,664 | 10/61 | Dreyfus | 88—22.5 |
| 3,098,112 | 7/63 | Horton | 88—1 |
| 3,134,840 | 5/64 | Gamo | 88—14 |

OTHER REFERENCES

Brown: "Correlation Between Photons in Two Coherent Beams of Light," Nature, Jan. 7, 1956, pp. 27 to 29.

Forrester: "On Coherence Properties of Light Waves," American Journal of Physics, April 1956, pp. 195–196.

Forrester: Journal of the Optical Society of America, vol. 51, No. 3, March 1961, pp. 253–259.

Kelsall: "Interferometic Measurement of Frequency Response With Automatic Recording," Optica Acta, vol. 5, Hors. Serie, January 1958, pp. 266–70.

Laine: "A Proposal for a Tunable Source of Radiation for the Far Infrared Using Beats Between Optical Masers," Nature, Aug. 19, 1961, pp. 795–796.

RALPH G. NILSON, *Primary Examiner.*

MAYNARD R. WILBUR, *Examiner.*